United States Patent Office — 3,689,460 — Patented Sept. 5, 1972

3,689,460
INTERPOLYMERS OF CARBON MONOXIDE AND
PROCESS FOR PREPARING SAME
Kenzie Nozaki, El Cerrito, Calif., assignor to Shell
Oil Company, New York, N.Y.
No Drawing. Filed Mar. 4, 1971, Ser. No. 121,162
Int. Cl. C08f 1/64, 13/04
U.S. Cl. 260—63 CQ          7 Claims

ABSTRACT OF THE DISCLOSURE

High melting, crystalline interpolymers of carbon monoxide with one or more unsaturated compounds such as aliphatic monoolefins particularly ethylene, are prepared by reacting carbon monoxide with said unsaturated compounds in the presence of selected inert solvents and a catalytic amount of tetrakis(triaryl phosphine) palladium, particularly tetrakis(triphenyl phosphine) palladium.

BACKGROUND OF THE INVENTION

Interpolymers of carbon monoxide and olefins, such as ethylene, as well as processes for their preparation are known.

Such interpolymers have been prepared, for example, by heating an olefin such as ethylene in an atmosphere of carbon monoxide in the presence of a suitable catalyst including peroxy compounds such as benzoyl peroxide (Brubaker—U.S. 2,495,286) and alkyl phosphine complexes of palladium salts such as tributyl phosphine complexes (ICI—British 1,081,304).

In general, the use of peroxy catalysts requires high pressures, i.e., above 500 atmospheres and, on occasion, up to 3,000 atmospheres in order to prepare solid polymers depending, of course, on the particular catalyst, concentration, monomers, etc. Thus, normally solid ethylene/carbon monoxide polymers are prepared at pressures from about 500 atmospheres (7,500 p.s.i.) to 1,000 atmospheres (15,000 p.s.i.). Also, it is generally necessary, in order to prepare solid polymers, to employ peroxy catalysts which are free of any Friedel-Crafts catalysts.

The use of the alkyl phosphine complexes of palladium salts requires a relatively high temperature, i.e., greater than 120° C. and relatively high pressures, i.e, greater than 2000 p.s.i. It is also known that these alkyl phosphines complexes, even at such elevated temperatures and pressures, still have relatively low reactivity, i.e, produce low yields of polymer.

It was found that higher yields of polymer could be obtained at significantly lower temperatures and pressures if palladium halide complexes of aryl-substituted phosphines were employed. This process is disclosed in copending patent application U.S. Ser. No. 121,161, filed Mar. 4, 1971. Although the use of palladium halide complexes of aryl phosphines does permit copolymerization at lower temperatures and pressures, there is still a need to produce a higher molecular weight polymer, in higher yield (i.e., grams of polymer per gram of catalyst) without significantly reducing the activity of the catalyst. It has now been found that high molecular weight polymers of carbon monoxide with ethylenically unsaturated monomers, particularly ethylene, can be prepared in high selectivity and conversion if the copolymerization is performed in the presence of tetrakis(triphenyl phosphine) palladium and selected solvents.

SUMMARY OF THE INVENTION

The present invention provides an improved process for preparing linear, high-melting, high-molecular weight interpolymers of carbon monoxide with at least one unsaturated compound, preferably an aliphatic monoolefin, and most preferably ethylene, wherein the comonomers are reacted in the presence of tetrakis (triaryl phosphine) palladium and certain selective solvents.

DESCRIPTION OF THE PREFERRED EMBODIMENT

The present invention will be described in greater detail with reference to the preparation of interpolymers of carbon monoxide and ethylene although it is understood that other suitable ethylenically unsaturated organic compounds may be employed.

By "ethylenically unsaturated organic compound" is meant those compounds which contain $C=C<$ linkage.

Examples of suitable unsaturated compounds coming within the scope of the present invention include the monoolefins, preferably containing from about 2 to 8 carbon atoms such as ethylene, propylene, butylene, isobutylene, and pentylene; diolefins such as butadiene, isoprene, and 2-chlorobutadiene-1,3; vinylidene compounds such as vinylidene chloride; tetrafluoroethylene; vinyl halides, esters and acetals, such as vinyl acetate, vinyl chloride, vinyl chloroacetate, vinyl dimethylacetate, and vinyl trimethylacetate; vinyl ketones such as vinyl methyl ketone and vinyl ethyl ketone; vinyl hydrocarbons such as styrene, chlorostyrene and alpha-methyl styrene; acrylic and methylacrylic acids, esters, amides, nitriles and acid halides; and vinyl esters of unsaturated carboxylic acids such as vinyl hexenoate, vinyl crotonate, etc. The above listing is not exhaustive and is presented as representative. Other unsaturated compounds will be apparent to one skilled in the art.

Preferred ethylenically unsaturated compounds include the monoolefins having from 2 to 8 carbon atoms. Particularly preferred is ethylene.

The present catalyst may be prepared prior to its addition to the polymerization reactor or it may be prepared in situ, i.e., the respective reactant components may be added to the reactor prior to or at the same time the monomers are added.

One suitable method for preparing the instant catalysts is described by L. Malatesta and M. Anzoletta, S.C.S. 1186 (1957) wherein $(\phi_3P)_2$ $PdCl_2$ and $\phi_3P$ is reacted in the presence of hydrazine.

In general, the catalysts which are operable in the present process have the following general structural formula:

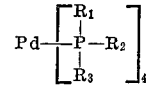

wherein $R_1$, $R_2$, and $R_3$ are hydrocarbon radicals, such as alkyl and aryl radicals. Suitable catalysts comprise those wherein $R_1$ and $R_2$ are each aryl or substituted aryl radicals and $R_3$ is an aryl, substituted aryl radical or alkyl radical such as methyl, ethyl, propyl, n-butyl, etc.

Preferred catalysts include those wherein $R_1$, $R_2$ and $R_3$ are each aryl or substituted aryl radicals such as phenyl, tolyl, xylyl, chlorophenyl, chloro-tolyl, naphthyl, etc.

A particularly preferred catalyst is tetrakis(triphenyl phosphine) palladium.

It has been found that although the substituents on the phosphorus atom may be aliphatic or aromatic, higher aromaticity of the phosphine produces superior catalysts. Accordingly, triaryl phosphines are preferred.

In general, the amount of catalyst will vary from as little as about 0.001% to as much as 5% by weight based on the total monomers charged. In most instances, for a number of reasons, it is generally preferable to utilize the minimum quantity of catalyst consistent with the desired purity, yield, conversion, etc.; however, amounts from about 0.005 to about 1% have been found suitable for most applications.

The catalyst, tetrakis (triaryl phosphine) palladium, appears to have very little, if any, activity in the absence of any solvent, therefore, the present process utilizes one or more solvents or diluents.

Suitable reaction media include the normally liquid, non-polymerizable, preferably volatile organic compounds and water, including the aromatic and saturated acylic and alicyclic hydrocarbons, ethers, esters, alcohols, amines, ketones, halogenated hydrocarbons, etc.

Representative media include the aromatic hydrocarbons such as benzene, toluene and xylene; saturated aliphatic hydrocarbons such as pentane, hexane, n-octane, isooctane, nonane, etc.; saturated cycloaliphatic hydrocarbons such as cyclohexane, cyclooctane, etc.; ethers such as dioxan, $HC(OCH_2)_2$, dimethyl ether of ethylene glycol, etc.; esters such as ethyl acetate, methyl benzoate, dimethyl adipate, etc.; alcohols such as methanol, ethanol, propanol, isopropanol, t-butanol, ethylene glycol, propylene glycol, etc.; ketones such as acetone, methyl ethyl ketone, methyl iso-butyl ketone, etc.; amines such as butyl amine, aniline, pyridine, etc.; phenols such as m-cresol, 2-naphthol, phenol, etc.; halogenated hydrocarbons such as chloroform, carbon tetrachloride, chlorobenzene, etc. Other suitable media includes kerosene, dimethyl formamide, pyridine, $CH_3OCH_2CH$, $CH_3CN$, tetrahydrofuran.

Especially suitable solvents include the nitrogen-containing solvents, particularly nitriles, such as acetonitrile.

In order to achieve acceptable catalyst activity and reaction rates, it is essential that the copolymerization be performed in the presence of a suitable solvent or reaction media. In general, those media which act as solvents for the catalyst system are suitable for use in the present process. As used herein, the medium is suitable if the catalyst solubility in said solvent is at least 0.001% by weight. It will be appreciated that one skilled in the art can conveniently select the most suitable solvent from this particular comonomer system, taking into consideration the pressures, temperatures, catalyst, catalyst concentration, etc.

In general, the amount of inert media may vary quite widely, however, very satisfactory results are obtained when the volume of the reactor occupied by the inert medium ranges from about 0.01% to about 90%. It will be appreciated that greater or lesser amounts of media may be employed as desired.

If desired, although not necessary, inert gases such as ethane, propane, hydrogen, nitrogen, carbon dioxide, etc. can be used to increase the pressure of the reactants within the reactor or to otherwise control the reaction rates, etc.

The polymerization of the carbon monoxide with the ethylenically unsaturated compound can be carried out either in a batch, semi-continuous or continuous process wherein the catalyst, either preformed or formed in situ in the reactors, solvent and the monomers are first charged into a suitable reaction vessel. The mixture is then generally heated either under autogeneous pressure or under superatmospheric pressure until the degree of polymerization is achieved.

The polymerization may be performed in vessels constructed or lined with glass, steel, copper, aluminum, silver, stainless steel, etc., however, stainless steel, or other inert metals are preferred.

In general, the polymerization process is performed at temperature ranging from about 75° to 150° C. and at pressures from slightly above atmospheric pressure to 1000 atmospheres.

It is preferred, however, to utilize temperatures of from about 75° to 125° C. and pressures from about 10 to 1000 atmospheres with from 25 to 150 atmospheres pressure being especially preferred.

In summary, in practicing the present process, a suitable vessel is employed which is constructed of or lined with an inert material and adapted to withstand high pressure. The reaction vessel is also equipped with heating and cooling means; means for agitating the contents thereof and means for introducing the monomers. The vessel is first charged with an inert diluent or solvent and the catalyst. If desired, other materials such as buffering agents may be added to stabilize the pH of the reaction system, which may require the addition of suitable acids and/or alkalis. After the reaction vessel is closed, the carbon monoxide and the ethylenically unsaturated monomers are introduced into the reactor. Heating and agitation of the reaction mixture is started. The pressure within the system may be maintained throughout the reaction period by injecting fresh monomers.

After the degree of polymerization is reached as determined by time, reduction in reactor pressure, etc., the vessel is bled of excess gases, opened and the resulting reaction materials removed. The polymeric material may then be recovered from the reaction mixture by suitable means employed in the art such as washing, solvent extraction, distillation, drying, filtration, and the like.

The resulting polymer may be further treated or modified by removal of residual catalyst or by the addition of the customary additives, such as pigments, fillers, antioxidants, stabilizers, etc.

In general, the ratio of reactants introduced into the reaction vessel will vary widely; however, the mole ratio of comonomers to the carbon monoxide will usually range from 1:1 to 25:1 with about 3:1 to 10:1 being preferred and about 5:1 to 10:1 being especially preferred.

The following examples are presented in order to illustrate the process of the present invention. It is understood, however, that the examples are for the purpose of illustration only and that the invention is not to be regarded as limited to any of the specific conditions or reactants recited therein. Unless otherwise indicated, parts described in the examples are parts by weight.

Example I

This example illustrates the improved copolymer yield obtained by the use of tetrakis(triphenyl phosphine) palladium catalyst over the alkyl-substituted and aryl-substituted phosphine complexes of palladium halides.

Into a 600-ml. Hastelloy B reactor were added 50.0 g. of acetonitrile, 0.714 g. $(\phi_3P)_4Pd$, 850 p.s.i.g. of ethylene and 150 p.i.s.g. of carbon monoxide with suitable precautions taken to exclude oxygen. The reactor was heated to 120 C. with agitation by rocking and the maximum pressure was 1700 p.s.i.g. After 18 hours at 120° C., the pressure had declined by 210 p.s.i.g. After cooling, the polymer was isolated by filtration as a light grey powder (14.50 g.) having a melting point in the 210°–220° C. range. An additional 2.5 g. of polymer was isolated by evaporation of the acetonitrile. The polymer is soluble in warm m-cresol and had an I.V. of 0.10 dl./g. (in m-cresol at 25° C.). The resulting polymer contained 64.3% C., 7.2% H and 28.9% O.

The above procedure was essentially repeated wherein the catalyst consisted of 0.55 g. $(\phi_3P)_2PdCl_2$. After 18 hours at 120° C., the pressure had declined by 160 p.s.i.g. and 9.3 g. of grey polymer were isolated by filtration and 2.0 g. were isolated from the solvent. The resulting polymer had a melting point of 215–225° C., was soluble in m-cresol and exhibited an I.V. (m-cresol) of 0.11 dl./g.

The above procedures were essentially repeated wherein the catalyst consisted of 0.50 g. $PdCl_2$ and 0.58 g. (n-butyl)$_3$P. After 18 hours at 120° C., only 1.85 grams of polymer were isolated having an M.P. of 210–220° C. and an I.V. (m-cresol) of 9.12 dl./g.

Example II

This example illustrates the copolymerization of ethylene with carbon monoxide over $(\phi_3P)_4Pd$ in the presence of $CH_3CN$ at various reaction parameters.

Into a 600-ml. Hastelloy B reactor were placed 20 g. of $CH_3CN$, 0.61 g. $(\phi_3P)_4Pd$, 600 p.s.i.g. of $C_2H_4$ and 600 p.s.i.g. CO. After 18 hours at 135° C., 3.9 g. of polymer insoluble in $CH_3CN$ was recovered having an M.P. of 125–150° C.

This procedure was essentially repeated wherein the reactor temperature, time and reactor pressure was varied. The results are tabulated in Table I.

TABLE I.—$C_2H_4$-CO POLYMER FORMATION OVER $(\phi_3P)_4Pd$

| Temp., °C. | Time, hr. | $(\phi_3P)_4Pd$, g. | $CH_3CN$, g. | $C_2H_4$, p.s.i.g. | CO, p.s.i.g. | Conv. CO, percent | Polymer Selec., percent | M.P., °C. | G. |
|---|---|---|---|---|---|---|---|---|---|
| 135 | 18 | 0.61 | 20 | 600 | 600 | 40 | 19 | 125–150 | 3.9 |
| 109 | 24 | 0.61 | 20 | 600 | 600 | 35 | 42 | 135–172 | 6.6 |
| 95 | 48 | 0.60 | 20 | 600 | 600 | 40 | 68 | 145–182 | 16.5 |
| 109 | 20 | 0.60 | 20 | 875 | 300 | 70 | 88 | 212–230 | 25.2 |
| 109 | 20 | 0.60 | 20 | 850 | 100 | >90 | 91 | 210–235 | 12.0 |
| 95 | 72 | 0.71 | 50 | 850 | 300 | 90 | 93 | 208–232 | 29.85 |

Example III

This example illustrates the effectiveness of various solvents on the instant process.

Into a 50-ml. stainless steel reactor were placed 2 g. of various solvents, 0.05 g. $(\phi_3P)_4Pd$, 850 p.s.i.g. $C_2H_4$ and 100 p.s.i.g. CO. After 18 hours at 110° C., the polymer was recovered.

The respective conversions are tabulated in Table II.

TABLE II.—EFFECT OF SOLVENTS ON $C_2H_4$-CO COPOLYMER FORMATION

Conditions: 18 hr./110° C., 0.05 g. $(\phi_3P)_4Pd$ and 2 g. solvent, 850 p.s.i.g. $C_2H_4$, 100 p.s.i.g. CO, 50 ml. S.S. reactor

| Solvent: | Conversion to polymer, percent |
|---|---|
| $CH_3OCH_2CN$ | 70 |
| $CH_3CN$ | 60 |
| Dimethyl formamide | 50 |
| Pyridine | 35 |
| Benzene | 25 |
| $HC(OCH_3)_3$ | 13 |
| $CH_3OCH_2CH_2OCH_3$ | Trace |
| Cyclohexane | Trace |

I claim as my invention:

1. A process for preparing high molecular weight interpolymers of carbon monoxide and at least one alpha-olefin having from 2 to 8 carbon atoms in improved yield which comprises reacting carbon monoxide and said alpha-olefin in an inert medium at 75° C. to 125° C. and 10 to 1000 atmosphere pressures in the presence of a catalytic amount of a tetrakis(triaryl phosphine) palladium, said mole ratio of alpha-olefin to carbon monoxide being from about 1:1 to 25:1.

2. A process as in claim 1 wherein the catalyst is employed in amounts from about 0.001% to 5% by weight of the monomers charged.

3. A process as in claim 1 wherein the tetrakis(triaryl phosphine) palladium is tetrakis(triphenyl phosphine) palladium.

4. A process as in claim 1 wherein the alpha-olefin is ethylene.

5. A process as in claim 1 wherein the inert medium is a nitrogen-containing hydrocarbon liquid.

6. A process as in claim 5 wherein the hydrocarbon liquid is acetonitrile.

7. A process as in claim 1 wherein the mole ratio of ethylene to carbon monoxide is 5:1 to 10:1.

References Cited

UNITED STATES PATENTS

| 3,530,109 | 9/1970 | Fenton | 260—63 |
| 2,680,763 | 6/1954 | Brubaker | 260—487 |
| 3,068,201 | 12/1962 | Michel | 260—63 |
| 3,083,184 | 3/1963 | Loeb | 260—63 |
| 2,495,286 | 1/1950 | Brubaker | 260—63 |

FOREIGN PATENTS

| 1,081,304 | 8/1967 | Great Britain | 260—63 CQ |

OTHER REFERENCES

γ-Lactones, Hayden, Chemical Abstracts, vol. 70, 1969, p. 114637p.

WILLIAM H. SHORT, Primary Examiner

L. L. LEE, Assistant Examiner

U.S. Cl. X.R.

260—94.9 B